United States Patent
Ishikawa et al.

(10) Patent No.: US 9,787,886 B2
(45) Date of Patent: Oct. 10, 2017

(54) BLURLESS IMAGE CAPTURING SYSTEM

(71) Applicant: The University of Tokyo, Tokyo (JP)

(72) Inventors: Masatoshi Ishikawa, Tokyo (JP); Hiromasa Oku, Tokyo (JP); Tomohiko Hayakawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 15/030,832

(22) PCT Filed: Oct. 16, 2014

(86) PCT No.: PCT/JP2014/077501
§ 371 (c)(1),
(2) Date: Apr. 20, 2016

(87) PCT Pub. No.: WO2015/060181
PCT Pub. Date: Apr. 30, 2015

(65) Prior Publication Data
US 2016/0261798 A1   Sep. 8, 2016

(30) Foreign Application Priority Data
Oct. 22, 2013 (JP) .................. 2013-218801

(51) Int. Cl.
*H04N 5/225* (2006.01)
*H04N 5/232* (2006.01)
(Continued)

(52) U.S. Cl.
CPC ......... *H04N 5/2259* (2013.01); *H04N 5/2254* (2013.01); *H04N 5/2328* (2013.01);
(Continued)

(58) Field of Classification Search
None
See application file for complete search history.

(56) References Cited

U.S. PATENT DOCUMENTS 7,747,153 B2   6/2010 Ibaraki
2014/0362177 A1 * 12/2014 Dunn .................... G03B 37/02
348/37

FOREIGN PATENT DOCUMENTS

CH   579265 A5 *  8/1976   ............. G01C 11/02
JP   6-18426 A    1/1994
(Continued)

OTHER PUBLICATIONS

Aloimonos et al., "Active Vision," *International Journal of Computer Vision 1* (4):333-356, 1988.
(Continued)

*Primary Examiner* — Justin P Misleh
(74) *Attorney, Agent, or Firm* — Seed IP Law Group LLP (57) ABSTRACT

A blurless image capturing system sequentially acquires images with little blur, even in a situation where a camera moves. An image capturing camera unit and a mirror unit are both capable of continuous movement in at least a one-dimensional direction. The image capturing camera unit acquires an image of a physical object present within an object region by directing line of sight direction towards the object region by means of the mirror unit. The mirror body changes the line of sight from the image capturing camera unit. The drive unit changes an angle of the mirror body in a given angular velocity in accordance with movement of the image capturing camera unit and the mirror body In this way it is possible to keep the line of sight from the image capturing camera unit directed towards a physical object for a given time. The drive unit directs the line of sight from the image capturing camera unit towards another object region by driving the mirror body. The control unit controls operation of the drive unit.

7 Claims, 6 Drawing Sheets

(51) Int. Cl.
  *G03B 15/00* (2006.01)
  *G03B 5/00* (2006.01)
  *G03B 17/17* (2006.01)
  *G06T 7/246* (2017.01)

(52) U.S. Cl.
  CPC ........... H04N 5/23264 (2013.01); *G03B 5/00* (2013.01); *G03B 15/00* (2013.01); *G03B 15/006* (2013.01); *G03B 17/17* (2013.01); *G06T 7/246* (2017.01)

(56) References Cited

FOREIGN PATENT DOCUMENTS

| | | |
|---|---|---|
| JP | 2006-140605 A | 6/2006 |
| JP | 2009-65605 A | 3/2009 |
| JP | 2009-71523 A | 4/2009 |
| JP | 2013-24968 A | 2/2013 |

OTHER PUBLICATIONS

Okumura et al., "High-speed Gaze Controller for Millisecond-order Pan/tilt Camera," IEEE International Conference on Robotics and Automation, Shanghai, China, May 9-13, 2011, pp. 6186-6191, 6 pages.
Extended European Search Report, dated Dec. 5, 2016, for European Application No. 14855430.6-1902 / 3062502, 7 pages.

\* cited by examiner

BLURLESS IMAGE CAPTURING SYSTEM

BACKGROUND

Technical Field

The present disclosure relates to technology for acquiring an image of a subject using a moving camera.

Description of the Related Art

In order to continuously shoot a subject, it is necessary to have a camera line of sight trained on a subject (physical object). This task is often undertaken manually by the photographer, but it is difficult to perfectly track something like the bouncing of a ball that is high speed and has irregular movement. For this reason, research into systems for automatically controlling the line of sight direction of a camera mechanically (so-called Active Vision: refer to Non-patent Publication 1 below) has become widespread in many fields.

With normal Active Vision technology, since the camera itself is moved while being attached to a drive platform, there is a delay in response speed with respect to movement in the line of sight direction. This makes tracking of a moving object that includes sudden acceleration changes (for example, a ball being used in a ball game) difficult. If the fact that the frame rate of a high speed camera reaches 1,000,000 fps in faster applications, and actual conditions where image processing is carried out at high speed by a GPU, are considered, it can be said that the line of sight control speed is a bottleneck to the speed aspects in various tracking systems.

In order to solve this problem, an optical system known as a Saccade Mirror has been proposed, to carry out change of the line of sight of a camera at high speed using small drive mirrors arranged in front of a camera (refer to Non-patent Publication 2 below). With this technology, using two-axis galvano mirrors makes high-speed line of sight change possible. Regarding a control system, if it were possible to control the line of sight so as to always keep a physical object in the center of the screen, it can be considered that unprecedented dynamic shooting would become possible.

However, in order to inspect structures that have been placed on a road, if sharp images of the structures can be obtained from a camera that is placed on a vehicle that is moving at high speed, it can be considered that it will be possible to simplify inspection operations. However, a system structure of a conventional Saccade Mirror is merely for capturing an image while tracking a physical object that moves at high speed. That is, a system of a conventional Saccade Mirror is not for handling a case where a camera itself is moving at high speed with respect to the subject. Also, with a conventional Saccade Mirror, when a physical object moves away from the center of the screen, control is carried out to correct mirror angle so that the physical object is repositioned at the center of the screen. If this is done, motion blur will occur within a captured image, accompanying adjustment of mirror angle. Under such circumstances it is considered difficult to use a conventional Saccade Mirror to handle inspections that requires high resolution.

In a situation where a physical object that is fixed is captured while moving a camera at high speed (for example 100 km/h), motion blur arises in the captured image. In order to accurately inspect a damaged state of the physical object using an image it is necessary to either lower the movement speed of a vehicle (namely movement speed of the camera), or shorten the exposure time. If movement speed of the vehicle is lowered, it is likely to result in deterioration in inspection efficiency. Also, if the exposure time is shortened it is likely to result in lowering of image quality.

There have been various proposals for technology to correct so-called handshake. However, that has been no technology proposed to alleviate the effects of motion blur in an image that has been acquired by a camera that moves at high speed.

Technology for alleviating motion blur by applying image processing (so-called deconvolution) to an image after capture has also been proposed. This image processing can be mainly divided into deconvolution, where PSF is known, and blind deconvolution, where PSF is not known. However, both types of image processing require calculation time, and so there is a problem in that real-time processing is difficult. For this reason, this procedure is not suitable for tracking control such as tracking a physical object using image information. Also, since this image processing is correction processing after motion blur has occurred, there is a problem in that it is basically not possible to restore to an original in the event that image information having high spatial frequencies has been lost.

Also, a procedure for reducing motion blur by applying pan/tilt to a camera itself in a direction in which a physical object moves, using actuators, has been proposed in Patent Publication 1 below. However, with this technology since the camera itself is driven the weight of the camera is a constraint making high-speed line of sight control difficult. For example, it is considered that an operation such as changing the line of sight direction from a camera, that moves at high speed, at a higher speed as movement speed of the camera itself becomes negligible would be difficult.

Also, the technology in Non-patent Publication 2 below is technology for continuously capturing images while tracking a physical object that moves at high speed, and is not intended to capture a physical object while a camera is moving at high speed.

CITATION LIST

Patent Literature

[Patent Publication 1]
U.S. Pat. No. 7,747,153

Non-Patent Literature

[Non-Patent Publication 1]
J. Aloimonos, I. Weiss and A. Bandyopadhyay: "Active Vision", Int'l Journal of Computer Vision, vol. 1, no. 4, pp. 333.356 (1988).
[Non-Patent Publication 2]
K. Okumura, H. Oku and M. Ishikawa: "High-Speed Gaze Controller for Millisecond-order Pan/tilt Camera", Proc. of IEEE Int'l Conf. on Robotics and Automation, pp. 6186. 6191 (2011).

BRIEF SUMMARY

Technical Problem

The present disclosure has been conceived in view of the above-described situation. A main object of the present disclosure is to provide technology that can continuously acquire images with little blur, even in an environment where a camera moves.

Solution to Problem

Means for solving the above-described problems can be described as in the following aspects.

(Aspect 1)

A blurless image capturing system, comprising an image capturing camera unit, a mirror unit, and a control unit, wherein the image capturing camera unit and the mirror unit are both capable of continuous movement in at least a one-dimensional direction;

the image capturing camera unit acquires an image of a physical object present within an object region by directing line of sight direction towards the object region by means of the mirror unit, the mirror unit is provided with a mirror body and a drive unit, the mirror body is capable of reflecting light flux, and in this way changing direction of the line of sight from the image capturing camera unit, the drive unit continuously directs the line of sight from the image capturing camera unit to the physical object for a given time by successively changing angle of mirror body in accordance with movement of the image capturing camera unit and the mirror body, the drive unit directs the line of sight from the image capturing camera unit to another object region by driving the mirror body, and the control unit controls operation of the drive unit.

(Aspect 2)

The blurless image capturing system of aspect 1, wherein the mirror body is constituted by a galvano mirror capable of rotation in forward and reverse directions, and the control unit directs the line of sight to the other object region by restoring the mirror body.

(Aspect 3)

The blurless image capturing system of aspect 1, wherein the mirror body is constituted by a polygon mirror capable of turning in one direction, and the control unit directs the line of sight to the other object region by driving the mirror body to turn.

(Aspect 4)

The blurless image capturing system of any one of aspects 1-3, wherein the control unit is provided with a tracking unit, the tracking unit detecting position of the physical object that is present in the object region, and controlling the drive unit so that the line of sight is directed to the physical object.

(Aspect 5)

The blurless image capturing system of any one of aspects 1-3, wherein the control unit is provided with a tracking unit, the tracking unit detecting relative speed of the image capturing camera unit with respect to the object region or the physical object, and controlling the drive unit such that the relative speed is effectively canceled out.

(Aspect 6)

The blurless image capturing system of aspect 5, wherein the tracking unit calculates the relative speed using the image that was acquired using the image capturing camera.

(Aspect 7)

The blurless image capturing system of aspect 5, wherein the tracking unit is provided with a tracking camera, and the tracking unit calculates the relative speed using positional change information for the physical object within images that have been continuously acquired by the tracking camera.

(Aspect 8)

The blurless image capturing system of any one of aspects 1-7, further comprising a light emitting unit, wherein the control unit irradiates illuminating light from the light emitting unit to the physical object while the physical object is being captured by the image capturing camera unit.

Advantageous Effect

According to the present disclosure it is possible to provide technology that can continuously acquire images with little blur, even in an environment where a camera moves.

DETAILED DESCRIPTION

A blurless image capturing system (hereafter sometimes abbreviated to "capture system") of one embodiment of the present disclosure will be described in the following with reference to the attached drawings.

Structure of the this Embodiment

Figure 1:
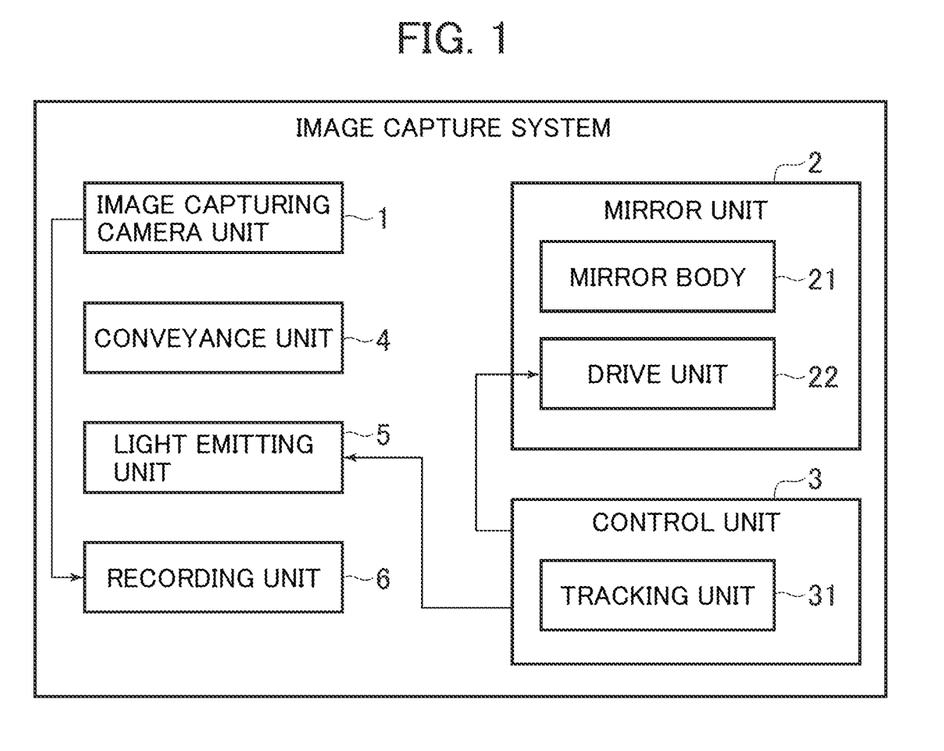
FIG. 1 is a block diagram showing the overall structure of an image capturing system of one embodiment of the present disclosure.

The capture system of this embodiment comprises an image capturing camera unit 1, a mirror unit 2, and a control unit 3, as shown in FIG. 1. The capture system of this embodiment also additionally comprises a conveyance unit 4, a light emitting unit 5 and a recording unit 6.

The image capturing camera unit 1 and the mirror unit 2 are both capable of continuous movement in at least a one-dimensional direction. In more detail, the image capturing camera unit 1 and mirror unit 2 of this embodiment are capable of being moved in at least a one-dimensional direction by the conveyance unit 4. The conveyance unit 4 is, for example, a vehicle on which the image capturing camera unit 1 and the mirror unit 2 are mounted. A more specific example of the conveyance unit 4 is a vehicle that is capable of traveling at around 100 km/h.

(Image Capturing Camera Unit)

The image capturing camera unit 1 acquires an image of a physical object present within an object region by directing line of sight direction towards the object region by means of the mirror unit 2. The physical object is a component such as a bolt that has been placed within a tunnel, for example. However, it is also possible for the physical object to be a body that exists in a wider range than angle of view, such as a wall of a tunnel. In this case, it is possible to consider that the physical object is present in the entire object region.

(Mirror Unit)

The mirror unit 2 is made up of a mirror body 21 and a drive unit 22.

The mirror body 21 is capable of reflecting light flux, and in this way changing direction of the line of sight from the image capturing camera unit 1. In more detail, the mirror body 21 of this embodiment is constituted by a galvano mirror that is capable of rotation in forward and reverse directions (refer to FIG. 2). It should be noted that the line of sight direction from the image capturing camera unit 1 is shown by the dot and dash line in FIG. 2.

Figure 2:
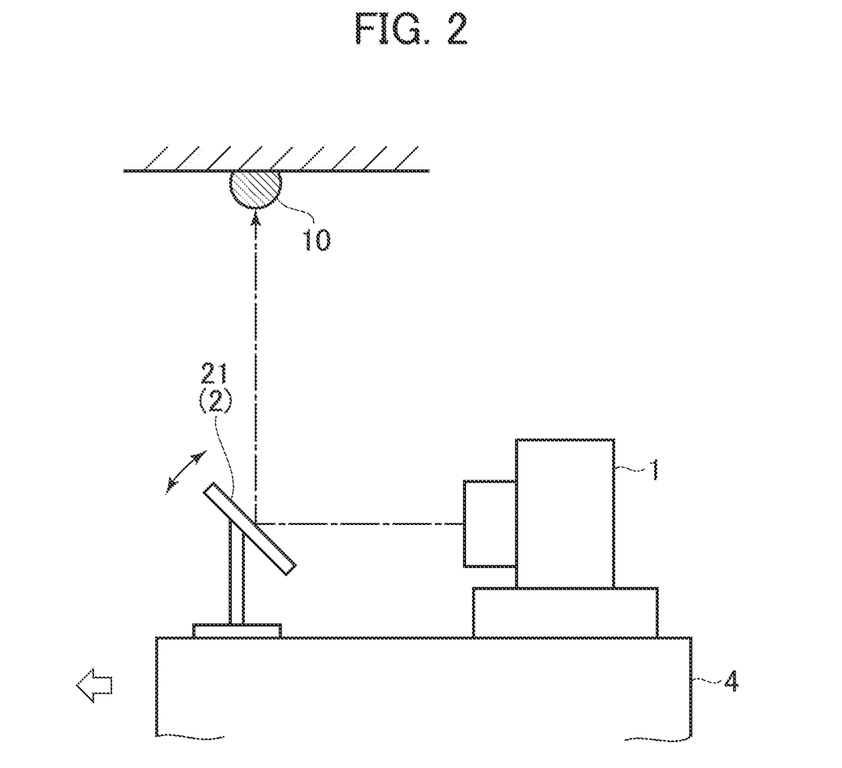
FIG. 2 is an explanatory drawing showing the schematic structure of an image capturing camera unit and a mirror unit in the system of FIG. 1.

The drive unit 22 continuously directs the line of sight from the image capturing camera unit 1 towards the physical object for a given time by successively changing angle of the mirror body 21 in accordance with movement of the image capturing camera unit 1 and the mirror body 21. The drive unit 22 also directs the line of sight from the image capturing camera unit 1 towards another object region (including a case where there is a region that has been shifted in one direction by a microscopic amount) by driving the mirror body 21. It is possible to use a control motor that is controlled by the control unit 3, for example, as the drive unit 22. As the drive unit 22 of this example, it is also possible to use a drive unit that can cause rotation of the mirror body 21 in forward and reverse directions at a desired angular velocity and at a desired timing, in accordance with control signals from the control unit 3. However, the drive unit 22 is not limited to a control motor, and it is also possible to use various actuators that can achieve desired operations.

(Control Unit)

The control unit 3 controls operation of the drive unit 22. The control unit 3 of this embodiment carries out:

operation to rotate the mirror body 21 in one direction (forward direction) so as to track a subject; and operation to direct the line of sight towards another object region (including a case where a region is shifted in one direction by a microscopic amount) by restoring the mirror body 21.

The control unit 3 of this embodiment is provided with a tracking unit 31. The tracking unit 31 detects position of a physical object present in an object region, and controls the drive unit 22 so that the line of sight of the image capturing camera unit 1 is directed towards the physical object. Specifically, the control unit 3 can be constituted by a personal computer and computer programs, for example. The control unit 3 can be provided with appropriate auxiliary devices as required, such as an appropriate I/O interface unit or a storage device (not shown in the drawings), but since these can be configured in the same way as a normal computer detailed description is omitted.

It should be noted that specific operation of the control unit 3 will be described later as a description of a method of operation of this embodiment.

(Light Emitting Unit)

The light emitting unit 5 emits lights at a given timing as a result of control signals from the control unit 3. LEDs, for example, can be used as the light emitting unit 5. More specifically, the control unit 3 irradiates illuminating light from the light emitting unit 5 to the physical object (or object region), while the physical object is being captured by the image capturing camera unit 1 (namely, during exposure).

(Recording Unit 6)

The recording unit 6 is a functional element for storing image data that has been acquired by the image capturing camera unit 1. The recording unit 6 may be a hard disk, for example, but is not restricted to this hardware structure as long as it is capable of storing image data as required.

Operation of this Embodiment

Next, operation of the capture system of this embodiment will be described while referring further to FIG. 3.

Figure 3:
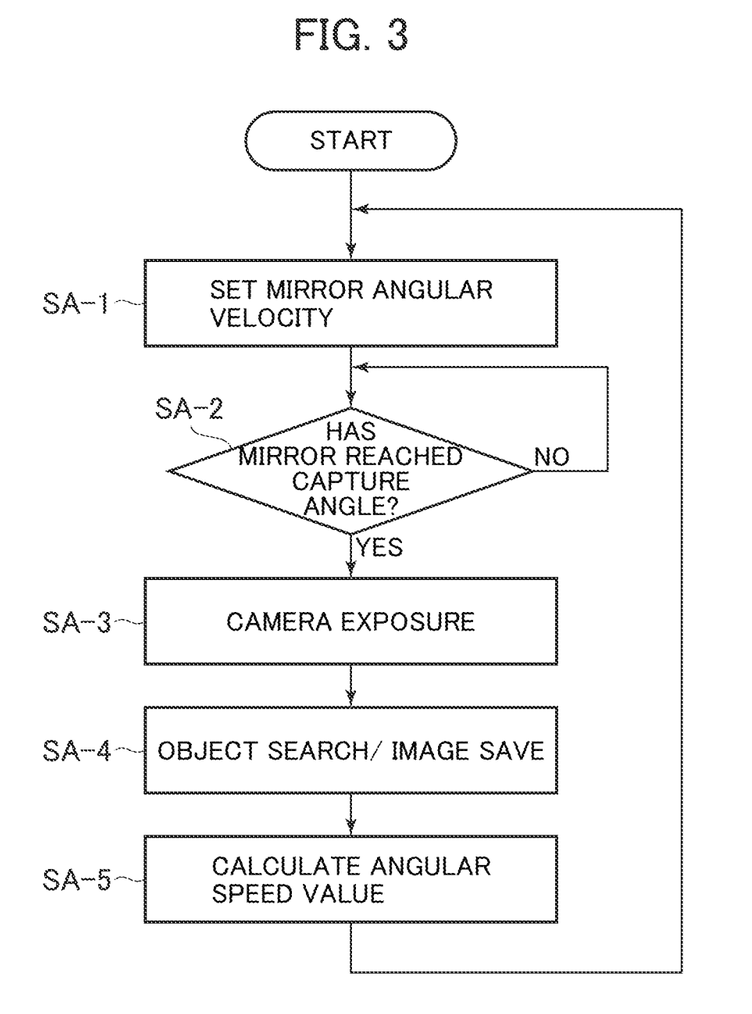
FIG. 3 is a flowchart for describing a capture method used in the system of FIG. 1.

(Step SA-1 in FIG. 3)

First, as an initial state, the image capturing camera unit 1 and the mirror unit 2 are moved at a substantially constant speed in a one dimensional direction (in the left direction of FIGS. 4A-4C), by the conveyance unit 4. Also, with this embodiment an initial value for angular velocity of rotation of the mirror body 21 is set. This initial value can be calculated using, for example, movement speed of the image capturing camera unit 1 by the conveyance unit 4 (predicted value), and distance to the physical object (predicted value).

(Step SA-2 in FIG. 3)

Next, the control unit 3 determines whether or not the mirror body 21 has reached an angle suitable for capturing the physical object (capture angle). This capture angle can be set in advance as a default value, for example. It should be noted that since the angle of the mirror body 21 in the initial state can be set to the default value, this determination may be omitted in the first operation. In the event that the angle of the mirror body 21 has not become the capture angle, the control unit 3 drives the mirror body using the drive unit 22 and then carries out the determination again. If the mirror body 21 has reached the capture angle, processing advances to the next step SA-3.

(Step SA-3 in FIG. 3)

Next, the control unit 3 commences exposure by the image capturing camera unit 1. This exposure is carried out over the course of a default exposure time, while carrying out rotation of the mirror body 21 in the forward direction. In this way, the image capturing camera unit 1 can acquire an image under conditions of the angular velocity that was set in step SA-1. Also, if the turning angle of the mirror body 21 has reached the default value, the control unit 3 stops exposure and also stops rotation. After that the control unit 3 carries out control so as to instantly restore the mirror body 21 at high-speed and return to the initial capture angle. It should be noted that a rotation period of the mirror body 21 in the forward and reverse directions is set in advance with this example.

(Step SA-4 in FIG. 3)

Next, the image capturing camera unit 1 sends an acquired image to the control unit 3. It is determined by the control unit 3 whether or not a physical object is present within the acquired image, using image processing. This determination can be carried out by, for example, determining whether or not a marker (not illustrated) that has been affixed to a physical object is present within the image, using appropriate image processing means such as template matching. In the event that a physical object does not exist within the image, SA-2 is returned to without saving the image, and processing is repeated.

In the event that a physical object is present within the acquired image, the control unit 3 stores that image (made a first image) in the recording unit 6, and then step SA-2 is returned to and processing is repeated. As a result of this repetition, with this embodiment, it is possible to acquire an image again in step SA-3 and advance to step SA-4.

Further, the control unit 3 determines whether or not the physical object that was recorded in the first image, that has already been acquired, is contained in the image that has been reacquired in step SA-3 (made a second image), using image processing. In the event that the physical object is not contained, step SA-2 is returned to and processing is repeated.

In the event that a physical object that was recorded in the first image is contained, processing advances to step SA-5.

(Step SA-5 in FIG. 3)

Next, the tracking unit 31 of the control unit 3 calculates an angular velocity value for the mirror body 21 using the acquired image, by a method that will be described later. The control unit 3 again sets the angular velocity of the mirror body 21 using the acquired angular velocity value (step SA-1), and repeats processing after that.

(Method of Calculating Angular Velocity)

Figure 4A:
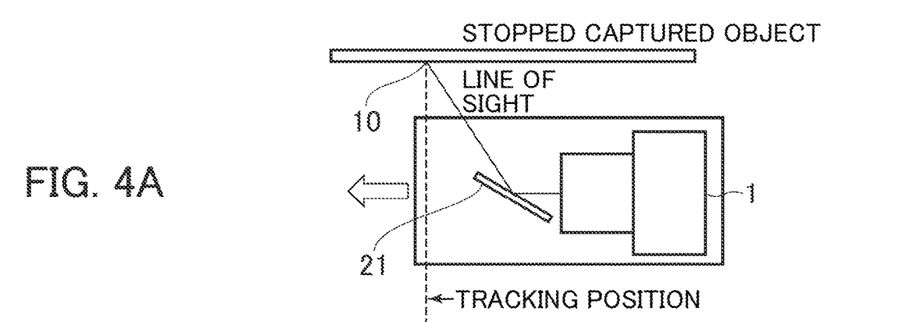
FIGS. 4A-4C are explanatory drawings for describing the capture method of FIG. 3.
Figure 4B:
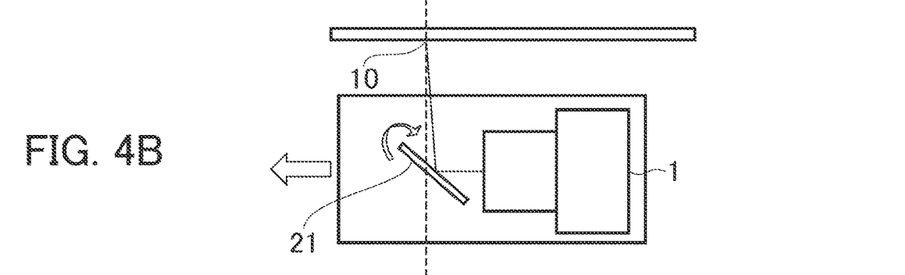
Figure 4C:
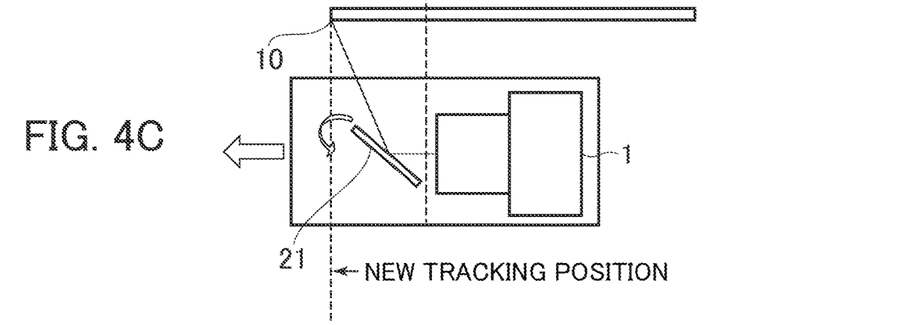
Figure 5A:
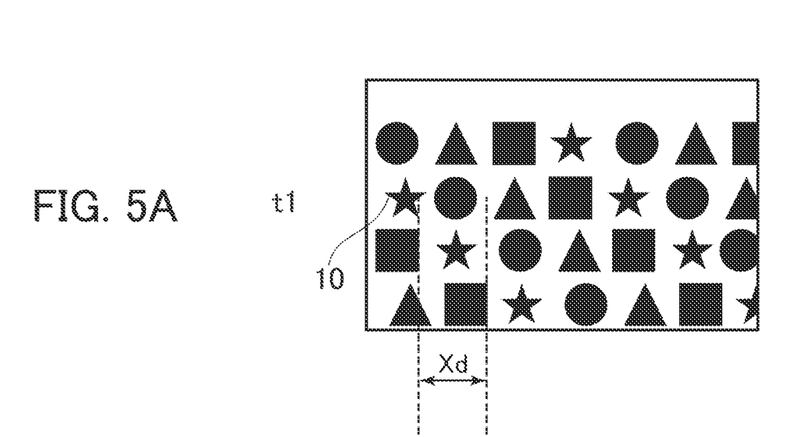
FIGS. 5A-5B are explanatory drawings for describing one example of a method of calculating angular velocity based on number of pixels.
Figure 5B:
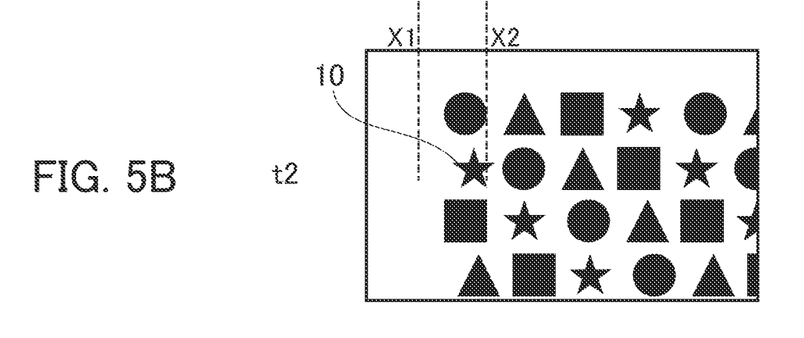

For example, an example of a first image that was acquired at a given exposure completion time t1 (at the time of completion of a time for transitioning from state (a) to state (b) in FIGS. 4A and 4B, for example) is shown in FIG. 5A. In FIGS. 4A-4C, in order to simplify the description, amount of movement of the image capturing camera unit 1 in a first rotation period of the mirror body 21 has been made large, but in actual fact rotation period of the mirror body 21 is usually a short time, and the amount of movement of the image capturing camera unit 1 in that time is minute. Next, an example of a second image that was acquired by the image capturing camera unit 1 at an exposure completion time t2 Δt seconds later (for example, a time point (c) in FIG. 4C) is shown in FIG. 5B. It should be noted that with the example of FIG. 4C also, exposure is performed while rotating the mirror body 21 for a given time, but illustration of this point has been omitted. Also, although angle of view is not shown in FIGS. 4A-4C, as long as angle of view is of a given width, it is sufficiently likely that the same physical object will be continuously contained in the 1st to nth images.

Figure 6:
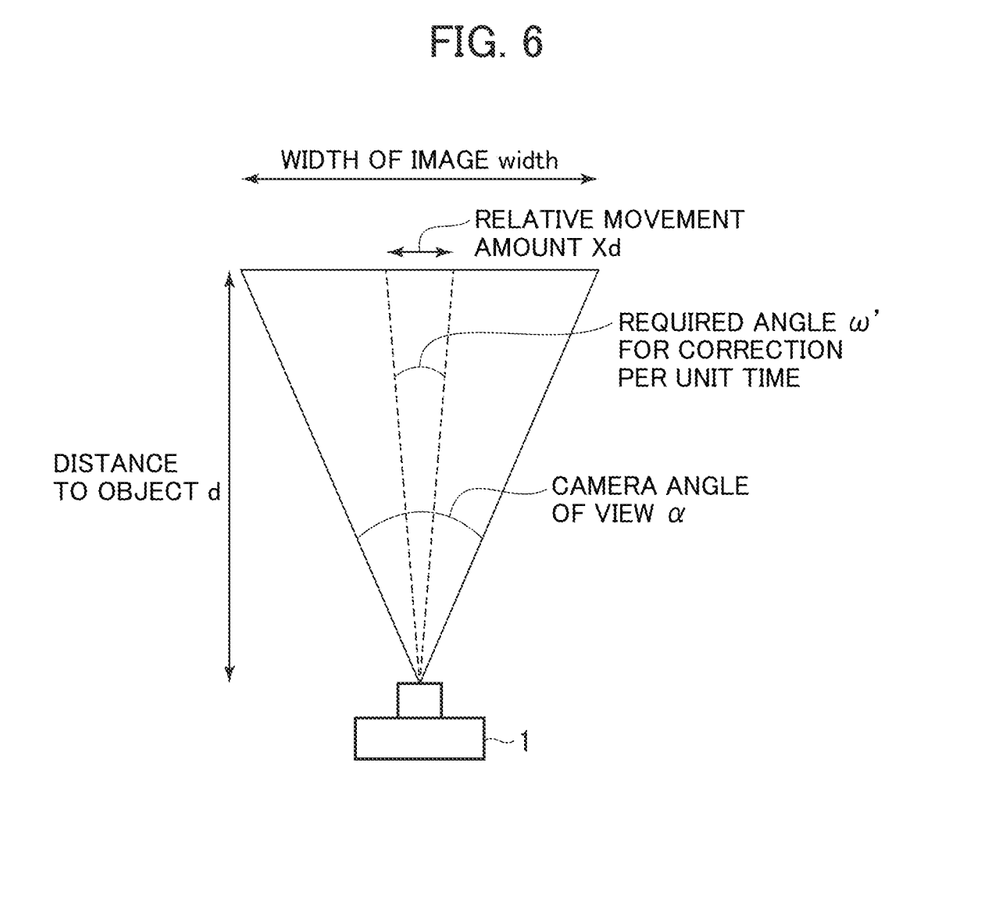
FIG. 6 is an explanatory drawing for describing each parameter used in one example of a method of calculating angular velocity.

Movement distance of the same physical object 10 on the planes of two images acquired as described previously is made $X_d$ (refer to FIGS. 5A and 5B). The tracking unit 31 of the control unit 3 calculates movement distance $X_d$ of the same physical object 10 on the planes of the images (in the case of a large physical object, specified locations within that object), and calculates an appropriate angular velocity (movement angle of the mirror body 21 per unit time) using this movement distance. This angular velocity can be calculated as follows, for example. First, referring to FIG. 6, width: width (length) of image in movement direction of image capturing camera unit d: distance from image capturing camera unit to physical object α: angle of view of image capturing camera unit ω': movement angle per unit time This establishes the following relationship.

$$\frac{\text{width}}{d} = \tan\frac{\alpha}{2}$$ Equation 1

$$\frac{x_d}{d} = \tan\frac{\omega'}{2}$$

Here, since terms other than ω' and d are already known, if one of the equations is rearranged with respect to d, d is substituted in the remaining equation and then the equation solved for ω', it is possible to obtain the relationship below. It should be noted that if the reciprocation cycle of the mirror body 21 is made extremely high speed, movement amount of the image capturing camera unit 1 with respect to the physical object will be miniscule, and can be ignored $$\omega' = 2\tan^{-1}\left(\frac{x_d}{\text{width}}\tan\frac{\alpha}{2}\right)$$ Equation 2

If this procedure is followed it is possible to obtain ω' even when the distance d to the physical object is not known.

As has already been described, the control unit 3 returns to step SA-1 and once again sets the movement angle (angular velocity) ω' that was acquired previously as angular velocity ω, and repeats subsequent processing. Operation of the overall system can be completed by operator instruction at an appropriate time.

If it is assumed that the movement velocity of the image capturing camera unit 1 will not fluctuate considerably, then position of the physical object on the planes of the images will be substantially fixed while the line of sight is being rotated at the obtained angular velocity ω'.

As a result, the image capturing camera unit 1 performs exposure while tracking the physical object 10, and it is possible to acquire images of the physical object 10. Accordingly, with this embodiment, there is the advantage that it is possible to keep amount of blur within an image low.

It should be noted that blur reduction technology using an equivalent computational approach can be used even if there is optical handshake correction mounted in a conventional consumer camera. However, with conventional technology, compared to the methods of this embodiment described above, there are significant restraints on angle of view that can be handled, and repeating a series of operations with high precision is difficult. With this embodiment, differing from a conventional optical system, by using a galvano mirror type mirror body 21 it is made possible to handle a wider angle of view. Further, the mirror body 21 of this embodiment is capable of reciprocal operation at sufficiently high-speed that it is possible to ignore movement amount of the image capturing camera unit 1, resulting in an advantage that it is also made possible to carry out recursive angular velocity calculation with high precision.

Also, with this embodiment, since the physical object 10 is being tracked by rotating the mirror body 21 that is comparatively light in weight, it is possible to obtain a high control performance for the line of sight direction, and as a result it is also possible to simplify lowering of blur amount.

Also, with this embodiment, since the image capturing camera unit 1 can perform exposure while the physical object 10 is being tracked, lengthening exposure time is made easy. If light amount from the light-emitting unit 5 is made constant, then an image of higher image quality and lower noise can be obtained the longer the exposure time. Accordingly, there is an advantage that it becomes possible to accurately carry out state detection of the physical object (for example, damage, etc.) based on an image of high image quality.

Also, in a case where exposure time is short, it is necessary to increase the amount of light emitted from the light emitting unit 5. Conversely, with this embodiment, since a long exposure time can be obtained, it becomes possible to keep the amount of light emitted from the light emitting unit 5 low. For example, in a case where the light emitting unit 5 is mounted on a moving vehicle, a storage battery or vehicle battery is used as a power source for the light emitting unit 5. As a result, with this embodiment, there is an advantage that it is possible to reduce the size of the storage battery, and prolonged operating time can be expected. Also, by keeping the amount of emitted light low, there is a practical advantage that it is possible to reduce any effect on other traveling vehicles.

With this embodiment, since a comparatively lightweight mirror body 21 is used, it is possible to carry out repetitive movement of the mirror body 21 rapidly. This means that in a case where movement speed of the image capturing camera unit 1 is fast, or in a case where placement interval of physical objects is short, there is the advantage that it is possible to appropriately acquire images of the physical objects.

MODIFIED EXAMPLES

Modified examples of the capture system of the previously described embodiment will be described in the following.

Modified Example 1

The mirror body can be constituted by a polygon mirror capable of rotation in one direction. In this case, the control unit can direct the line of sight toward another object region by rotationally driving the mirror body.

Modified Example 2

The tracking unit can be configured to detect a relative speed of the image capturing camera unit relative to an object region or physical object, and control the drive unit so that the relative speed is effectively canceled out.

Modified Example 3

It is possible, in modified example 2, for the tracking unit to calculate relative speed using images that have been acquired using the image capture camera.

Modified Example 4

In modified example 2, the tracking unit may be provided with a tracking camera. The tracking unit can calculate the relative speed using positional change information for the physical object within images that have been continuously acquired by the tracking camera.

The content of the present invention is not limited to each of the described embodiments. Various modifications are possible to the specific structure for the present invention, within the scope described in the patent claims.

For example, each of the above-described structural elements can exist as a functional block, and can also exist as independent hardware. Also, as a method of implementation, it is possible to use hardware or to use computer software. Further, a single functional element of the present disclosure may be realized as a set of a plurality of functional elements, and a plurality of functional elements of the present disclosure may be implemented by a single functional element.

Also, functional elements may be located at positions that are physically separated from one another. In this case, associated functional elements may be connected by means of a network. Functions may be realized by means of grid computing or cloud computing, and alternatively functional elements may also be constituted.

The invention claimed is:

1. A blurless image capturing system, comprising an image capturing camera unit, a mirror unit, and a control unit, wherein
the image capturing camera unit and the mirror unit are both capable of continuous movement in at least a one-dimensional direction;
the image capturing camera unit acquires images of a physical object present within an object region by a line of sight from the image capturing camera unit towards the object region, the line of sight directed by the mirror unit,
the mirror unit comprises a mirror body and a drive unit,
the mirror body is capable of reflecting light flux to change direction of the line of sight from the image capturing camera unit,
the drive unit continuously directs the line of sight from the image capturing camera unit to the physical object for a given time by changing an angle of the mirror body in a given angular velocity ($\omega'$) in accordance with movement of the image capturing camera unit and the mirror body,
the drive unit directs the line of sight from the image capturing camera unit to another object region by driving the mirror body, and
the control unit controls operation of the drive unit, wherein
the control unit is configured to calculate the given angular velocity ($\omega'$) by using the images acquired by the image capturing camera unit and by using:
movement distance ($X_d$) of the same physical object on planes of the images;
width of the images in movement direction of the image capturing camera unit; and
angle of view ($\alpha$) of the image capturing camera unit.

2. The blurless image capturing system of claim 1, wherein the mirror body is constituted by a galvano mirror capable of rotation in forward and reverse directions, and
the control unit directs the line of sight to the other object region by restoring the mirror body.

3. The blurless image capturing system of claim 1, wherein the mirror body is constituted by a polygon mirror capable of turning in one direction, and
the control unit directs the line of sight to the other object region by driving the mirror body to turn.

4. The blurless image capturing system of claim 1, further comprising a light emitting unit, wherein
the control unit is constructed to irradiate illuminating light from the light emitting unit to the physical object while the physical object is being captured by the image capturing camera unit.

5. The blurless image capturing system of claim 1, wherein
the control unit is configured to calculate the given angular velocity ($\omega'$) in accordance with:

$$\omega' = 2\tan^{-1}\left(\frac{x_d}{\text{width}}\tan\frac{\alpha}{2}\right)$$

wherein,
$X_d$ is the movement distance of the same physical object on the planes of the images,
width is the width of the images in movement direction of the image capturing camera unit, and
$\alpha$ is the angle of view of the image capturing camera unit.

6. The blurless image capturing system of claim 1, wherein
the given angular velocity ($\omega'$) is calculated by using neither a distance from the image capturing camera unit to the physical object nor ground speed of the image capturing camera unit.

7. A blurless image capturing method using the blurless image capturing system of claim 1, wherein
the control unit executes steps of:

calculating the given angular velocity ($\omega'$) by using the images acquired by the image capturing camera unit, controlling the drive unit by using the angular velocity so as to substantially cancel out relative speed of the image capturing camera unit against the object region or the physical object, and wherein the image capturing camera unit executes a step of acquiring the images of the physical object during a period of tracking the physical object.

\* \* \* \* \*